May 11, 1948.  M. H. LICHTER  2,441,426
CALCULATING DEVICE
Filed July 4, 1945

Inventor:
Martin H. Lichter

Patented May 11, 1948

2,441,426

UNITED STATES PATENT OFFICE 2,441,426

CALCULATING DEVICE

Martin H. Lichter, Honolulu, Territory of Hawaii

Application July 4, 1945, Serial No. 603,136

3 Claims. (Cl. 235—84)

This invention relates to a calculating device for determining phases of the menstrual cycle for women.

Among other objects, the invention aims to provide a simple calculator easily understood and operated by women themselves by which they may determine the optimum period of fertility, and also the period of probable sterility.

Another object is to provide a device for recording for future reference the date of onset of menstruation.

Other objects and advantages will become apparent from the following description of one device embodying the invention and illustrated in the accompanying drawing.

Figure 1:
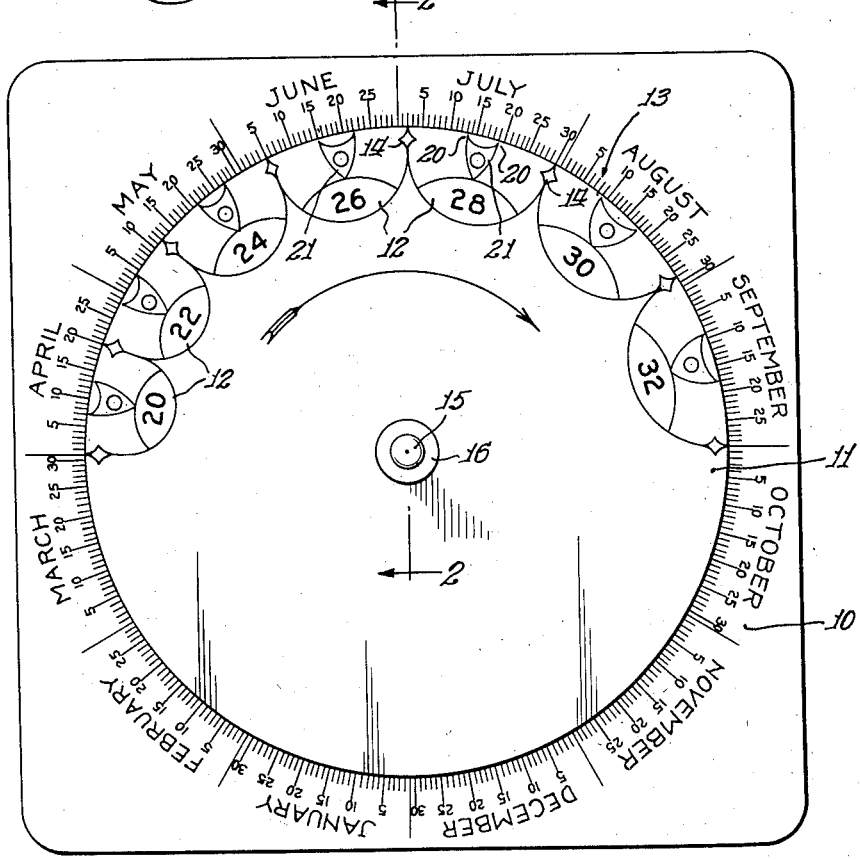
Fig. 1 is a plan view of the device.
Figure 2:
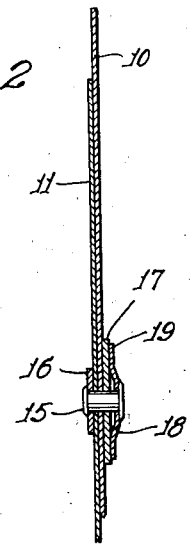
Fig. 2 is a central section taken on the plane 2—2 of Fig. 1.

There is a widespread misunderstanding regarding menstrual phases of sterility, fertility and ovulation in women and an even greater reluctance to consult physicians on the subject, with the result that many women desirous of children find it difficult to conceive and in many cases have erroneously concluded that they were completely sterile. The illustrative calculator is based on the so-called rhythm theory of determining periods of fertility and sterility proposed by Drs. Ogino and Knaus. According to this theory which apparently is fairly generally accepted by the medical profession, conception in women is possible or probable only during a short period of two to six days approximately midway in the menstrual cycle. During the balance of the cycle women are probably sterile. It is unnecessary to set forth in detail the basis for this theory beyond stating that the length of fertility of the ovum and its accessibility for impregnation is limited to a very short period. Indeed, the period during which conception will probably occur is limited to about two days, preceded and followed by periods of about two days' length during which conception is possible.

The present calculator comprises relatively rotatable scales or charts 10 and 11, the former representing successive calendar months and days thereof and the latter the phases of the average menstrual cycle. The respective charts are advantageously made of a plastic such as Celluloid or some other durable sheet material. To make the calculator universal among women, the cycle chart 11 contains a series of units 12 representing time diagrams of average menstrual cycles of different durations. In this case, these units embrace the predominant periods varying from 20 to 32 days, as indicated by the numbers 20-32. Erratic or abnormal periods are disregarded as being unpredictable. The scale on which the several units 12 is formed corresponds with the scale 13 of the calendar element 10, e. g., the 28-day cycle unit 12 embraces (between the arrows 14 thereon) 28 days on the calendar scale 13. As here shown, the latter is sub-divided into successive calendar months and the successive days of each month. These are appropriately indicated as shown. February is represented as of leap-year length, 29 days, and the additional day may be subtracted during other years.

Figure 3:
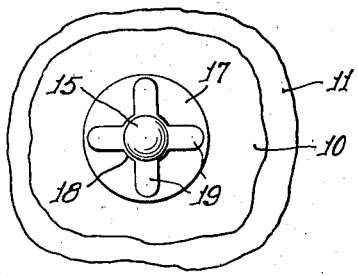
Fig. 3 is a fragmentary rear view on a larger scale, of a friction pivot.

The charts are riveted together by a rivet 15 or the like provided on both sides with bearing washers 16 and 17. In addition, a friction element 18 (Fig. 3) having spring fingers 19 is placed under the rivet head 17 at the back of the calculator and stressed (by heading of the rivet) to apply pressure between the charts 10 and 11 by which relative rotation is resisted sufficiently to prevent accidental displacement between the charts once they have been set. The device therefore serves another function, independently of its use as a fertility and sterility calculator, of registering for future reference, the onset of the menstrual cycle. By "registering" is meant the setting of the charts to provide a record for future reference.

In using the calculator, the unit 12 representing the particular individual's average menstrual cycle is selected. The others may be ignored. Assuming that the cycle is 28 days (which is average for most women) the charts are relatively rotated until the left-hand arrow on the 28-day unit 12 registers with the first day of the menstrual cycle, that is, the beginning of the cycle as determined by personal observation. In the setting as illustrated in Fig. 1, this falls on July 2. The right-hand arrow then registers July 30 (28 days later), that is, the beginning of the next cycle. Approximately midway between the beginning and the end of the cycle on each of the units 12 is indicated on the same time scale, the duration of the ovulation or fertility phase. This phase is shorter in length for the shorter menstrual cycles, averaging about 6 days, and is shown longer for the longer cycles to indicate possible fertility for a slightly longer period in such cycles. It is embraced between the points 20 on the scale which mark respectively the beginning and end of the phase of fertility, which in the illustration given for the 28-day cycle falls between July 13 and July 19. The areas 21 represented by these phases are advantageously conspicuously marked by being colored red against a white or other background. In this case, they also are marked with the letter "O" which is located in the middle of the period and indicates the interval (of about two days) in the middle of the period during which conception is most likely to occur. On either side of the center are periods (of about two days each) during which conception is possible.

The beginning of the ovulation period can readily be checked, once its approach is indicated on the charts by phenomena or symptoms which women can promptly learn to recognize.

The portions of the scale 12 between the arrow 14 and the point 20 represents respectively phases of pre-menstrual and post-menstrual sterility.

Once the calculator is set, it serves either as a record only of the onset of the next menstruation (if its use be thus limited) or as a complete record of all phases of the menstrual cycle. The scale 12 is advanced periodically, and also appropriately adjusted if need be, because of irregularities, which generally accompany outside influences such as unusual fatigue, or intercurrent illness. Also, if over a period of time the average menstrual cycle alters, as it often does, a shift to the appropriate shorter or longer cycle on unit 12 should be made.

Obviously, the invention is not limited to the details of the illustrative calculator, since these may be variously modified. Moreover, it is not indispensable that all features of the invention be used conjointly, since various features may be used to advantage in different combinations and sub-combinations.

Having described my invention, I claim:

1. A calculator for determining the calendar date of periods of fertility, ovulation and sterility in women which comprises in combination a pair of relatively rotatable charts, one of which carries a circular scale whose entire perimeter is sub-divided proportionately to the length of the several calendar months and the days of each month, and the other chart having thereon and adjacent to the scale of the first-named chart a series of selected arcuate time diagrams representing in length on the same scale as the first-named chart the duration of various average menstrual cycles, the latter chart being rotatable relative to the first-named chart to register the beginning of the selected arcuate diagram with the beginning of the menstrual cycle on the calendar scale, said latter chart also having in the middle of each of said arcuate diagram an indication of the length representing on the aforesaid scale the ovulation period appropriate for the menstrual cycle.

2. A universal calculator for determining and registering the phases of a menstrual cycle comprising in combination a pair of superposed relatively rotatable calendar and phase charts made of sheet material and rotatably secured together at their respective axes of rotation, the underlying chart being the calendar chart and having a circular scale thereon sub-divided into the days and months of the calendar year, the overlying chart being the phase chart and being circular in contour and of a diameter to lie inside said circular scale of the calendar chart, said phase chart having a series of selective arcuate diagrams adjacent its periphery which in length on the same scale as said calendar chart represent the duration of menstrual periods of various lengths and having an index representing the beginning of the cycle and another representing the end of the cycle, each diagram having thereon indices representing the length of the ovulation phase of the menstrual cycle represented by that diagram and being relatively located on said diagram to indicate the average duration and occurrence of the ovulation phase relative to the beginning and end of the menstrual cycle, said phase chart being rotatable relative to the calendar chart to register the beginning index with the appropriate date on said calendar chart, thereby registering the indices of said ovulation phase diagram with the dates on said calendar chart to indicate the beginning of said ovulation phase.

3. A universal calculator for determining and registering the phases of a menstrual cycle comprising in combination a pair of superposed relatively rotatable calendar and phase charts made of sheet material and rotatably secured together at their respective axes of rotation, the underlying chart being the calendar chart and having a circular scale thereon sub-divided into the days and months of the calendar year, the overlying chart being the phase chart and being circular in contour and of a diameter to lie inside said circular scale of the calendar chart, said phase chart having a series of selective arcuate diagrams adjacent its periphery which in length according to the scale of said calendar chart represents the duration of menstrual periods of various lengths and having an index at each end representing respectively the beginning and the end of the period, each diagram having thereon indices whose spacing represents the length on the aforesaid scale of the ovulation phase of the menstrual cycle and is relatively located on said diagram to indicate the beginning and the end of the ovulation phase relative to the beginning and end of the menstrual cycle, said phase chart being relatively rotatable to said calendar chart to register the beginning index of the selected diagram with the date on said calendar chart representing the beginning of the cycle, thereby automatically registering said indices on said calendar chart to indicate the beginning and end of the ovulation period, and friction means for preventing accidental rotation or displacement of one chart relative to the other whereby the setting of the phase chart on the calendar chart provides a register for future reference of the several phases of the menstrual cycle.

MARTIN H. LICHTER.

REFERENCES CITED

The following references are of record in the file of this patent:

UNITED STATES PATENTS

| Number | Name | Date |
|---|---|---|
| 306,629 | Maertens | Oct. 14, 1884 |
| 1,495,805 | Rooney | May 27, 1924 |